(12) United States Patent
Zdornov et al.

(10) Patent No.: US 11,379,411 B2
(45) Date of Patent: Jul. 5, 2022

(54) SYSTEM AND METHOD FOR REPLICATING FILE SYSTEMS IN REMOTE OBJECT STORAGES

(71) Applicant: Vast Data Ltd., Tel Aviv (IL)

(72) Inventors: Vladimir Zdornov, Kfar Saba (IL); Asaf Levy, Tel Aviv (IL); Asaf Weissman, Kiryat Ono (IL); Or Dahan, Karkur (IL); Hillel Costeff, Tel-Aviv (IL)

(73) Assignee: Vast Data Ltd., Tel Aviv (IL)

( * ) Notice: Subject to any disclaimer, the term of this patent is extended or adjusted under 35 U.S.C. 154(b) by 79 days.

(21) Appl. No.: 17/081,153

(22) Filed: Oct. 27, 2020

(65) Prior Publication Data

US 2021/0042263 A1    Feb. 11, 2021

Related U.S. Application Data

(63) Continuation-in-part of application No. 16/241,124, filed on Jan. 7, 2019.

(51) Int. Cl.
*G06F 12/00* (2006.01)
*G06F 16/11* (2019.01)

(52) U.S. Cl.
CPC ................. *G06F 16/128* (2019.01)

(58) Field of Classification Search
CPC ............. G06F 3/0608; G06F 11/1451; G06F 11/1407; G06F 3/0631; G06F 3/067; G06F 11/3034; G06F 3/064; G06F 2201/88; G06F 2201/84; G06F 2201/835; G06F 3/0619; G06F 3/065

USPC .......................................... 711/162
See application file for complete search history.

(56) References Cited

U.S. PATENT DOCUMENTS

| | | | |
|---|---|---|---|
| 8,332,376 B2 | 12/2012 | Martinez et al. | |
| 8,429,630 B2 | 4/2013 | Nickolov et al. | |
| 8,468,244 B2 | 6/2013 | Redlich et al. | |
| 9,424,437 B1 | 8/2016 | Ancin et al. | |
| 10,534,759 B1* | 1/2020 | Manjunath | G06F 16/128 |
| 11,212,574 B2* | 12/2021 | Chung | H04L 67/1097 |
| 2016/0292429 A1* | 10/2016 | Manville | G06F 16/137 |
| 2017/0149890 A1‡ | 5/2017 | Shamis | G06F 15/17331 |
| 2020/0201814 A1‡ | 6/2020 | Danilov | G06F 16/1734 |

\* cited by examiner
‡ imported from a related application

*Primary Examiner* — Mardochee Chery
(74) *Attorney, Agent, or Firm* — M&B IP Analysts, LLC

(57) ABSTRACT

A system and method for replicating a file system. The method includes: copying a portion of the file system from a first storage, wherein the at least a portion of the file system includes underlying data and metadata, wherein the metadata includes pointers to the underlying data and metadata defining a file system hierarchy; partitioning the copied data of the file system into a plurality of blobs, wherein the plurality of blobs includes a plurality of data blobs and a plurality of metadata blobs, wherein each data blob includes at least one portion of the underlying data; generating a plurality of filter objects based on the copied data, wherein each filter object includes a list of metadata blobs; and storing the plurality of blobs and the plurality of filter objects in a second storage.

21 Claims, 8 Drawing Sheets

SYSTEM AND METHOD FOR REPLICATING FILE SYSTEMS IN REMOTE OBJECT STORAGES

CROSS-REFERENCES TO RELATED APPLICATIONS

This application is a continuation-in-part of U.S. patent application Ser. No. 16/241,124 filed on Jan. 7, 2019, now pending, the contents of which are hereby incorporated by reference.

TECHNICAL FIELD

The present disclosure relates generally to storing data in remote object storages, and more specifically to replicating file systems in such remote object storages.

BACKGROUND

With the increasing move to cloud-based computing, various cloud providers have increased their offerings. In particular, as websites provide a vastly increasing amount of content including both user-generated and professionally produced content, the data storage requirements needed for cloud computing services have grown exponentially.

One particular requirement for website providing user-generated content is the ability to scale storage on demand. As a result, cloud service providers have developed several solutions for providing scalable cloud storage. One such solution is the remote object storage, examples of which include Amazon Simple Storage Service (S3), Google Cloud Platform, and Microsoft Azure. Some of these solutions further offer tiered storage, which allows for storing data based on anticipated demand in order to allow clients to reduce costs when the anticipated demand is lower. These tiers may include a high end tier intended for cases where high availability and frequent access are needed, a medium tier intended for cases where high availability is needed but frequent access may not be, and a low end tier intended for cases where high latency is acceptable such as when archiving data.

Because many enterprises increasingly rely on cloud service providers for storing their data, techniques which allow for efficiently replicating their data in the remote storages are needed. Further, since cloud service providers are third-party entities which utilize their own software, their services may not be compatible with enterprise systems by default and therefore may require software to bridge the gap.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for replicating a file system. The method comprises: copying at least a portion of the file system from a first storage, wherein the at least a portion of the file system includes underlying data and metadata, wherein the metadata includes pointers to portions of the underlying data and metadata defining a file system hierarchy of the file system; partitioning the copied data of the file system into a plurality of blobs, wherein the plurality of blobs includes a plurality of data blobs and a plurality of metadata blobs, wherein each data blob includes at least one portion of the underlying data, wherein the plurality of metadata blobs include a plurality of data content blobs and a plurality of name content blobs, the data content blobs having pointers to respective data blobs of the plurality of data blobs, wherein the name content blobs are created based on the metadata defining the file system hierarchy of the file system; generating a plurality of filter objects based on the copied data, wherein each filter object includes a list of metadata blobs, wherein the metadata blobs listed in each filter object include at least one of the plurality of data content blobs and at least one of the name content blobs; and storing the plurality of blobs and the plurality of filter objects in a second storage.

Certain embodiments disclosed herein also include a non-transitory computer readable medium having stored thereon causing a processing circuitry to execute a process, the process comprising: copying at least a portion of the file system from a first storage, wherein the at least a portion of the file system includes underlying data and metadata, wherein the metadata includes pointers to portions of the underlying data and metadata defining a file system hierarchy of the file system; partitioning the copied data of the file system into a plurality of blobs, wherein the plurality of blobs includes a plurality of data blobs and a plurality of metadata blobs, wherein each data blob includes at least one portion of the underlying data, wherein the plurality of metadata blobs include a plurality of data content blobs and a plurality of name content blobs, the data content blobs having pointers to respective data blobs of the plurality of data blobs, wherein the name content blobs are created based on the metadata defining the file system hierarchy of the file system; generating a plurality of filter objects based on the copied data, wherein each filter object includes a list of metadata blobs, wherein the metadata blobs listed in each filter object include at least one of the plurality of data content blobs and at least one of the name content blobs; and storing the plurality of blobs and the plurality of filter objects in a second storage.

Certain embodiments disclosed herein also include a system for replicating a file system. The system comprises: a processing circuitry; and a memory, the memory containing instructions that, when executed by the processing circuitry, configure the system to: copying at least a portion of the file system from a first storage, wherein the at least a portion of the file system includes underlying data and metadata, wherein the metadata includes pointers to portions of the underlying data and metadata defining a file system hierarchy of the file system; partitioning the copied data of the file system into a plurality of blobs, wherein the plurality of blobs includes a plurality of data blobs and a plurality of metadata blobs, wherein each data blob includes at least one portion of the underlying data, wherein the plurality of metadata blobs include a plurality of data content blobs and a plurality of name content blobs, the data content blobs having pointers to respective data blobs of the plurality of data blobs, wherein the name content blobs are created based on the metadata defining the file system hierarchy of the file system; generating a plurality of filter objects based on the copied data, wherein each filter object includes a list of metadata blobs, wherein the metadata blobs listed in each filter object include at least one of the plurality of data content blobs and at least one of the name content blobs; and storing the plurality of blobs and the plurality of filter objects in a second storage.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
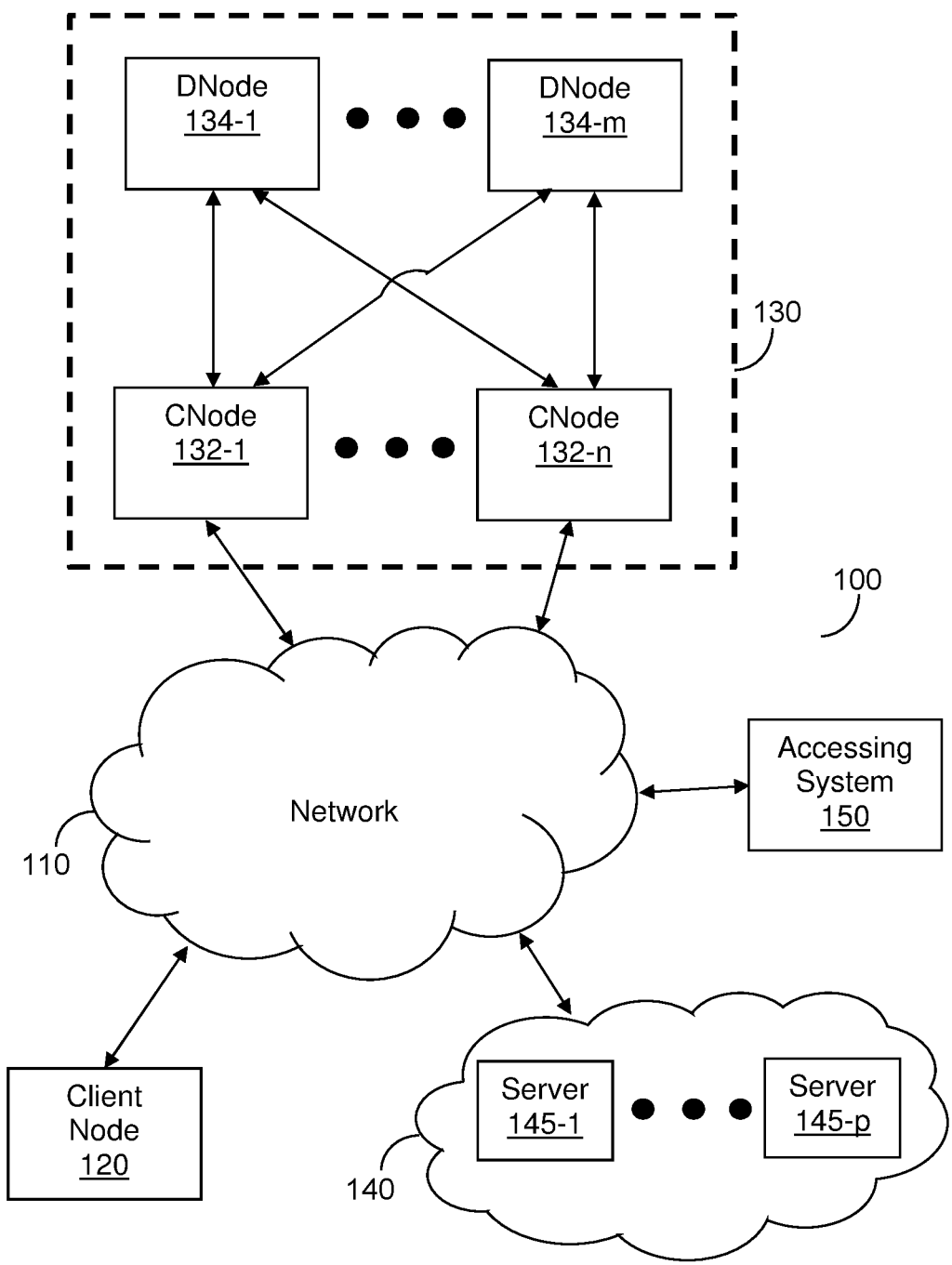
FIG. 1 is a network diagram illustrating a distributed storage system utilized according to various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for replicating file system directories or portions of file system directories in remote object storages. Snapshots of a file system are taken. The snapshots represent a file system hierarchy of the file system and may be, but are not limited to, snapshots of an element store. The file system and its file system directory are replicated in a remote object storage based on one of the snapshots. More specifically, the file system and its directory are replicated by generating and distributing filter objects and blobs in the remote object storage. Each filter object stores a list of blobs, where each blob is a collection of data including name data, a logical range of the blob, and a hash-based filter of pointers to data in the replicated file system. The blobs include metadata blobs including replicated file system directory data and data blobs including replicated data from the file system. In an embodiment, the replicated file system directory is partitioned into shards in the remote object storage, with each shard including respective portions of the filter objects and blobs.

The disclosed embodiments may be implemented in a system that acts as an intermediary between an application layer of a storage system and a client of a remote object storage system. Accordingly, the disclosed embodiments may be utilized to provide a convenient application programming interface between a local storage system and a remote storage system that allows for both writing (e.g., via snapshot replication, deletion, and maintenance) and reading (e.g., ingesting access to remotely stored snapshots).

The disclosed embodiments further provide techniques for replicating a file system directory in a remote object storage that allows for improved efficiency of reading in the replicated directory location. More specifically, reads may be performed more quickly and without searching through as many potential results. Additionally, by partitioning the filter objects in the remote object storage based on snapshots in the original storage as described herein, the replicated directory may be accessed with high granularity, which in turn allows for more efficient maintenance of and access to specific data.

Accordingly, the disclosed embodiments may be utilized to improve performance such that the storage activities performed on the remote object storage can be adequately efficient even when at least some of the remote object storage provides slower or otherwise suboptimal storage. Further, the disclosed embodiments may be utilized to provide a low-cost backup option for data without requiring use or creation of a dedicated disaster recovery site. Snapshots replicated in accordance with the disclosed embodiments may be utilized to restore specific files from specific snapshots without requiring a particular compute node.

Moreover, due to the granularity of access, the disclosed embodiments may be utilized to allow clients to define remote retention policies for snapshots in the remote object storage which allows for highly granular maintenance of snapshots and for defining different retention policies between a local storage and a replicated remote storage. As a non-limiting example, a local retention policy may store snapshot data for 1 month, while a remote retention policy may store snapshot data for 7 years.

FIG. 1 is an example network diagram 100 illustrating a distributed storage system utilized according to various disclosed embodiments. The network diagram 100 includes a network 110, a client node 120, a distributed storage system 130, and a remote object storage 140.

The distributed storage system 130 includes compute nodes 132-1 through 132-n (referred to as a CNode 132 or as CNodes 132 for simplicity) and storage nodes (DNodes) 134-1 through 134-m (referred to as a DNode 134 or as DNodes 134 for simplicity). The distributed storage system 130 may be configured as described further in U.S. patent application Ser. No. 16/002,676, assigned to the common assignee, the contents of which are hereby incorporated by reference.

The network 110 may be, but is not limited to, a wireless, cellular or wired network, a local area network (LAN), a wide area network (WAN), a metro area network (MAN), the Internet, the worldwide web (WWW), similar networks, and any combination thereof. The client node 120 may be, but is not limited to, a server, a personal computer, a laptop, a tablet computer, a smartphone, or any other device configured to store data, access data, or both.

According to various disclosed embodiments, the CNodes 132 are configured to replicate a file system directory representing data stored in the DNodes 134 in the remote object storage 140. To this end, the CNodes 132 may be configured to perform such replication upon request (e.g., upon receiving a request from the client node 120) or based on one or more conditions (e.g., periodically, when a threshold amount of data has been stored since the last time the file system was replicated, when a change is made to the file system stored in the DNodes 134, combinations thereof, etc.).

The remote object storage 140 includes servers 145-1 through 145-p (where p is an integer having a value of 2 or greater). The servers 145-1 through 145-p may be realized via hardware, software, or combinations thereof. The remote object storage 140 may be a cloud object storage such as, but not limited to, Amazon Simple Storage Service (Amazon S3) or any other cloud provider storage. Alternatively, the remote object storage 140 may be any cloud-compatible appliance.

The DNodes 134 may be realized as combinations of volatile (e.g., RAM) and non-volatile (e.g., Flash, 3D Xpoint) memories. The non-volatile memories may be included in, for example, hard-disk drives (HDDs), solid state drives (SSDs), or a combination thereof.

The CNodes 132 are configured to translate access commands into formats supported by the DNodes 134. Example protocols supported via translation by the CNodes 132 may include, but are not limited to, Block protocols, Network Attached System protocols [e.g., Network File System (NFS) protocol, Server Message Block (SMB) protocol, etc.], Object Store protocols [e.g., Simple Storage Service (S3) protocol], Key Value Store protocol, and the like. Because the CNodes 132 are configured to translate access commands into a format that is supported by the protocol of the DNodes 134, support for new protocols may be added by configuring the CNodes 132 with translation rules for the new protocols. The translation rules may include rules for converting access commands in a received format into a format that is compatible with the protocol supported by the DNodes 134.

The CNodes 132 collectively act as a distributed transaction manager for accessing data in the DNodes 134. As the CNodes 132 do not store the data to be accessed by client nodes or the metadata used for navigating to locations in the DNodes 134 (e.g., metadata defining a file system hierarchy), such data and metadata do not need to be recovered when one or more of the CNodes 132 fails. Additionally, CNodes 132 may be added or removed without disrupting data stored in the storage system 130. An example schematic diagram of a CNode 132 is described below with respect to FIG. 8.

The client node 120 is configured to send access commands to the distributed storage system 130 via the network 110. The CNodes 132 are configured to receive access commands from the client node 120 and to access the DNodes 134 based on the received commands. The access may include translating the received commands into a format supported by the DNodes 134. As shown in FIG. 1, each CNode 132 may access all DNodes 134. As a non-limiting example, NVM Express (NVMe) over Fabrics may be utilized to enable such access.

Figure 2:
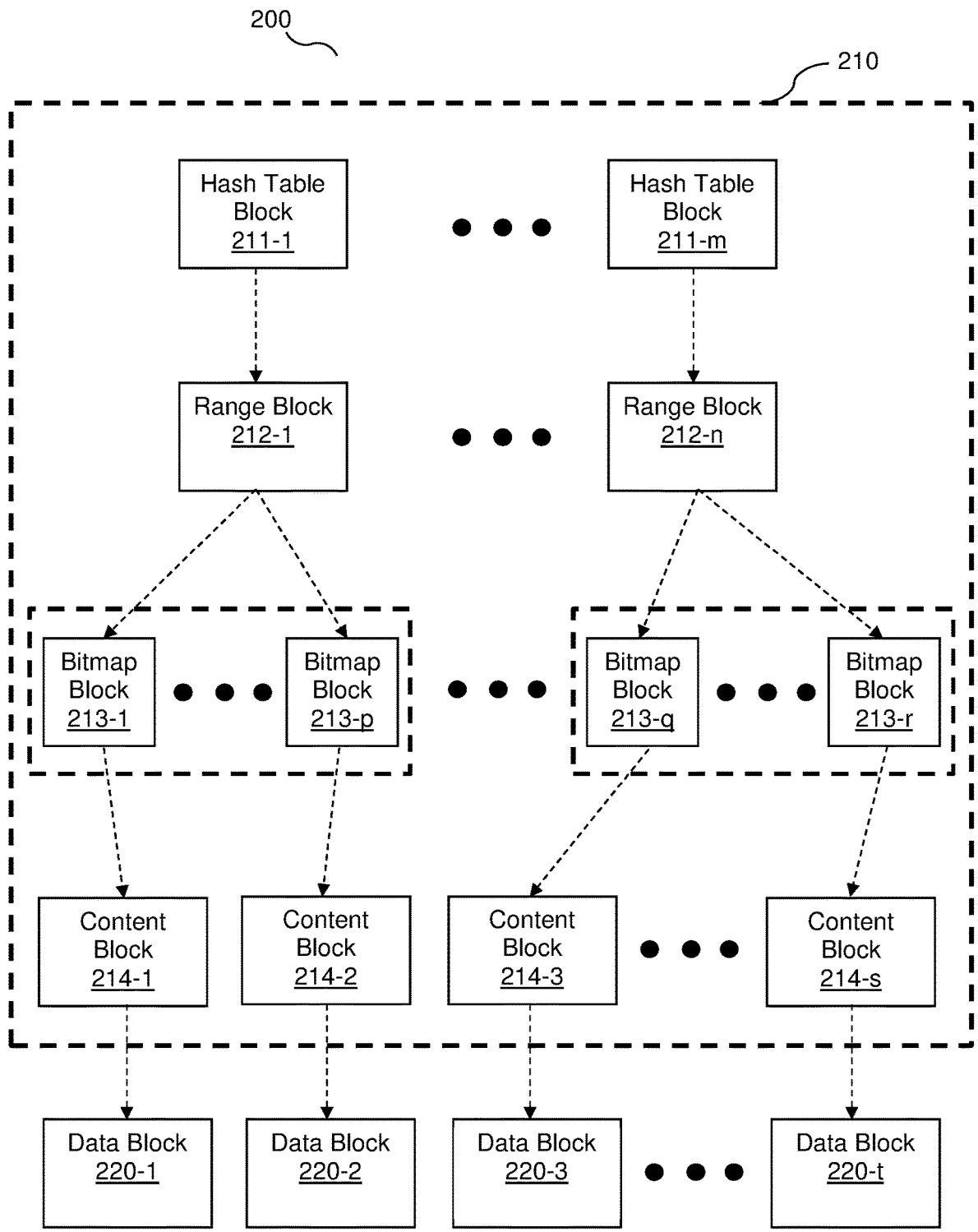
FIG. 2 is a virtualization model of an element store representing a file system to be replicated.

The access may include navigating element trees stored in the DNodes 134 (e.g., the element trees of the element store 210, FIG. 2) to access data in data blocks stored in the DNodes 134 (e.g., the data blocks 220, FIG. 2). The CNodes 132 are configured to navigate the element trees to read the data blocks 220 and to modify the element trees by, for example, splitting blocks, merging blocks, and the like. To this end, the CNodes 132 may be configured to allocate new blocks, write data to blocks, read data from blocks, add and remove pointers in blocks, and the like.

In some implementations, to allow for restoring of CNodes 132 when there are no active CNodes 132 or otherwise to allow for reading from the remote object storage without requiring an active CNode 132, an accessing system 150 may further be configured to perform at least a portion of the disclosed embodiments such as, but not limited to, the methods for restoration described below with respect to FIG. 5. To this end, the accessing system 150 may be configured as described below with respect to the CNode 132 of FIG. 8 and storing instructions for performing at least a portion of the disclosed embodiments.

An example element store which may be replicated in accordance with the disclosed embodiments is now described with respect to FIG. 2.

FIG. 2 is an example virtualization model 200 of an element store representing a file system directory to be replicated. The virtualization model 200 includes an element store 210 and data blocks 220. The element store 210 includes element trees of metadata blocks. The metadata blocks at the bottom level of the element store 210 point to the data blocks 220, which are locations in a physical storage. In an embodiment, the metadata blocks include hash table blocks 211, range blocks 212, bitmap blocks 213, and content blocks 214. The data blocks 220 are included in a data store (not shown).

In the example virtualization model 200, each element tree has a respective hash table block 211-1 through 211-$m$ at its top level. Each hash table block 211 may point to one or more range blocks 212, each of which in turn points to a range of bitmap blocks 213. Each bitmap block 213 points to one or more content blocks 214, thereby forming a tree made up of a hash table block 211, range blocks 212, bitmap blocks 213, and content blocks 214. Additional blocks may be added on demand, for example as files are written or additional elements are created.

In the virtualization model 200, the top level of the element store 210 includes the respective hash table blocks 211 of all elements. Each hash table block 211 includes a handle that is a unique identifier of its respective element and points to a range block 212. The hash table blocks further include global information such as latest attributes from the element, a locks list (i.e., identifying locks on blocks of the element's respective tree), or both.

The hash table blocks 211 collectively provide for use of a hash table including composite blocks for each element as buckets of the hash table. Specifically, each composite block of a hash table includes a hash table block 211 and its child blocks (e.g., range blocks 212 and bitmap blocks 213).

The hash table may be maintained as a consistent hash table by balancing portions of the hash table among storage nodes (e.g., the DNodes 134, FIG. 1) such that the storage nodes store equal portions of the hash table. When memory devices (e.g., 3D Xpoint devices) storing the hash table are added or removed, the hash table may be balanced among the remaining memory devices. The hash table includes the root of each element.

The range blocks 212 point to the bitmap blocks 213 using offset ranges such that each range block 212 points to one or more offset ranges that each include multiple bitmap blocks 213. When there are more bitmap blocks than there are available range block pointers for a first range block 212, a second range block 212 may be a child of the same hash table block 211 and point to a second range of the bitmap blocks 213. The range blocks 212 allow the element store 210 to have a high span out, i.e., a large number of children per block, because the range blocks can each point to a high number of child blocks. Further, each range block 212 may point to another range block 212 instead of or in addition to any of the bitmap blocks 213, thereby allowing the element store 210 to grow indefinitely as its respective element grows.

Each range block 212 may be a container including tuples such as ranges and pointers, where each tuple describes a pointer to a child block. Each range may point to a location of a child block (e.g., an address of one of the bitmap blocks 213). The ranges may be, for example, byte ranges. As a non-limiting example, a 4-kilobyte range block can hold around 170 24-byte tuples and, therefore, can point to an equal amount (around 170) of children blocks.

Each bitmap block 213 may be a container including tuples such as timestamps, data identifiers, and pointers. The timestamp is based on a consistent global (i.e., system-wide) counter that increments over time. The counter may advance, for example, at fixed intervals, each time a user request is received (e.g., a request to access data), and the like. The timestamps allow for creating snapshots of past versions of the element trees by correlating snaplines of specific times with the relevant timestamps. The data identifiers define which parts of data the bitmap block relates to, and the pointers are to respective child blocks (e.g., content blocks 214). Each bitmap block 213 may be assigned a sequence number token based on its timestamp relative to other timestamps to allow for efficient comparisons of order when orders for acting on bitmap blocks must be determined (e.g., when multiple bitmap blocks are to be locked, they may be locked in order from earliest to latest).

The bitmap block 213 tuples may further include clone identifiers that are assigned to snapshots from different points in time. The clone identifiers allow for creating writeable copies, also referred to as clones or snapshots, of elements from different points in time.

Updating the global counter may include creating a snapline for the element store 210 based on the bitmap blocks 213. Each snapline indicates contents of a portion of the metadata blocks at a point in time. The portion may include blocks of one or more elements. Because of the persistent nature of the metadata blocks, data of previous versions of the blocks are maintained when updated to add new data. The snaplines allow for efficiently reading block contents from different points in time.

The content blocks 214 include pointers to the data blocks 220. The content blocks 214 provide horizontal views of the respective snaplines that allow for efficient reading of the snaplines. Each of the content blocks 214 includes a range for a respective location in physical data and may be shared among different elements. Accordingly, the content blocks 214 further include element identifiers indicating which elements each content block 214 belongs to. Because the content blocks 214 consume more space than other blocks 211 through 213, the content blocks may be stored on Flash while the other blocks 211 through 213 are stored on XPoint to reduce costs of storage.

It should be noted that the virtualization diagram 200 is merely an example. The disclosed embodiments may equally replicate file system metadata without departing from the scope of the disclosure.

Returning to FIG. 1, each element tree may be a tree of metadata blocks that represents an element of the element store. An element is a persistent metadata structure that is used to access the metadata. Each element includes at least an attribute store (not shown) including metadata blocks storing attributes. Each attribute has a key and corresponding value. The attributes may include different types of values such as, but not limited to, identifiers (i.e., pointers to other locations), size, time of last access, access control lists (ACLs), application-specific uses (e.g., identifying an object for S3), and the like. Once created, the elements allow for reading of the data blocks regardless of the protocol of the command which triggered its creation, for example, a S3 write request may trigger creation of an element for the data blocks while the data blocks can be read based on a NFS read request.

At least some of the attributes are pointers to other locations. A pointer attribute may have a <key,value> of <name,identifier>, where the identifier is either a handle of an element or an identifier of a physical location in one of the DNodes 134. Each metadata block may have multiple pointers, at least some of which point to other metadata blocks, thereby creating a tree or buckets. A pointer attribute that acts as a pointer to another metadata block is a link, which allows for navigation among metadata blocks for an element. The metadata block that is pointed to by a link may be stored in another device (e.g., in a device of a different DNode 134).

In some implementations, one or more of the metadata blocks may store an immediate value rather than a pointer to a location in the DNodes 134. The immediate value includes data that would otherwise be stored in the data blocks 220, FIG. 2. As a non-limiting example, the data blocks may be stored in a metadata block when the size of the data block is less than 1 kilobyte.

Each element may further include an element data store (not shown) allowing for read and write operations of data to the element. Whether the element includes an element data store may depend on the type of the element. As a non-limiting example, a file may have an element data store. The element data store may be thinly provisioned with byte granularity such that the number of bytes written to the element data store is the number of bytes used.

At least a portion of the data blocks may be temporarily included in the elements and stored in, for example, 3D Xpoint memory of the DNodes 134 before being migrated from the 3D Xpoint memory to Flash memory of the DNodes 134. When the data is migrated to the Flash memory, the pointers of the elements which had stored the migrated data may be updated to point to the location of the migrated data in the Flash memory. The temporary storage of the data blocks allows for manipulating the data blocks (e.g., via encoding, data reduction, etc.) in the 3D Xpoint memory before migrating the data blocks to the Flash memory.

In an embodiment, the CNodes 132 are configured to perform snapline-related operations that involve interacting with snaplines. To this end, such operations may include, but are not limited to, creating snaplines, deleting snaplines, writing to snaplines, reading from snaplines, creating snapshots based on snaplines, and writing to snapshots. Each snapline represents metadata pointers in the storage system 130 at a point in time and point to offset ranges such that the snaplines can be utilized to create snapshots of portions of the storage system 130 at previous times. The times at which snaplines are created are indicated based on a global counter that is consistent across the CNodes 132. The global counter is updated periodically. Each snapline therefore represents any updates to metadata in the storage system 130 that occurred around the same time as indicated by updates having the same global counter.

Creating a snapline includes storing a timestamp and a status of each offset range in the DNodes 134 in a bitmap block (e.g., one of the bitmap blocks 213, FIG. 2). The snapline is associated with a time of the global counter at which the snapline was created. In a further embodiment, to ensure crash consistency in the storage system 130, write acknowledgments by the CNodes 132 are paused during creation of a new snapline such that dependent writes are not included in any snaplines in which their dependencies are not included. In an example implementation, snaplines are created periodically, for example every second.

Figure 3:
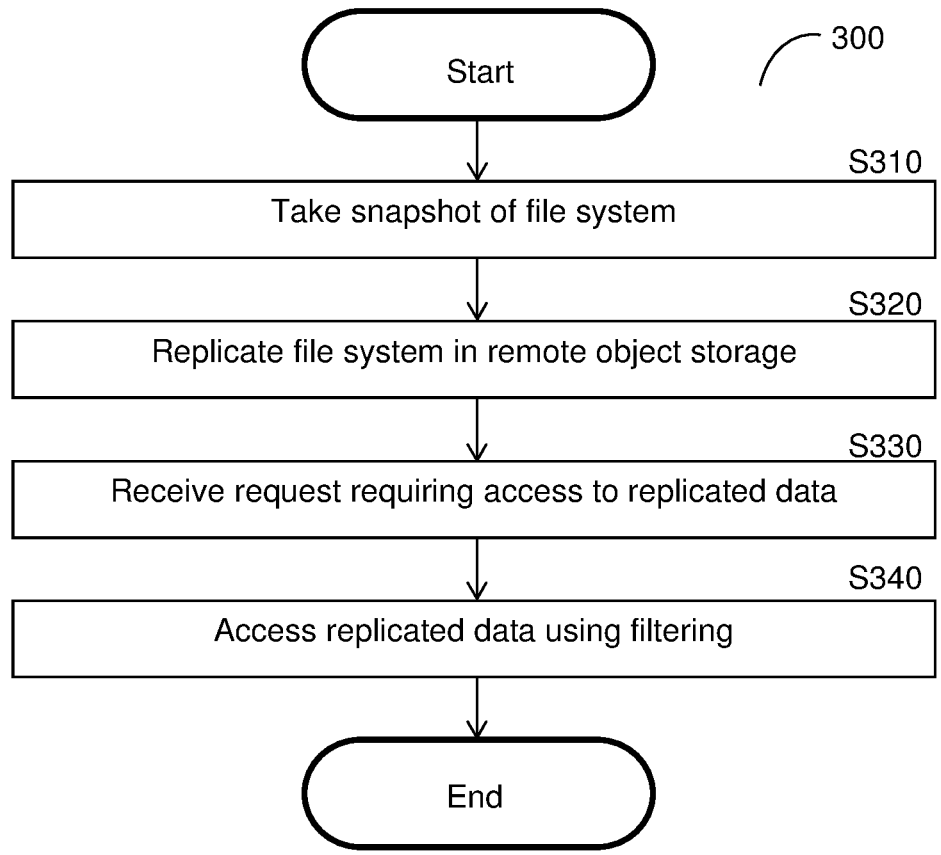
FIG. 3 is a flowchart illustrating a method for replicating a file system using snapshots according to an embodiment.

FIG. 3 is an example flowchart 300 illustrating a method for replicating a file system directory using snapshots according to an embodiment. In an embodiment, the method is performed by one of the CNodes 132, FIG. 1.

At S310, a snapshot of a file system to be replicated is taken. The snapshot represents a state of at least a portion of the file system at a given point in time, and includes metadata reflecting that state. Such metadata reflecting the state of the file system may include, but is not limited to, metadata defining a file system hierarchy at the given point in time.

In an example implementation, the snapshot may be captured as described below with respect to FIGS. 6-7 and as described further in the above-referenced U.S. patent application Ser. No. 16/241,124, assigned to the common assignee, the contents of which are hereby incorporated by reference. Utilizing snapshots as described with respect to FIGS. 6-7 and U.S. patent application Ser. No. 16/241,124 allows for restoring specific files from specific snapshots without requiring a particular compute node.

Thus, in an embodiment, each snapshot may indicate a snapline having a timestamp matching a corresponding time that is not to be erased. The timestamp may be based on a global counter for the file system having the snapshot taken. The snapshot can therefore be used to selectively retain portions of the file system metadata (e.g., metadata defining a file system hierarchy of the file system for which the snapshot was taken).

Consequently, files may be restored from the replicated file system. To this end, in an embodiment, S310 further includes storing a remote copy of the snapshot in the remote object storage to which the file system will be replicated. Storing a copy of the snapshot used for replicating the file system in the same location as the replicated file system allows for restoring specific files from the original file system without requiring a particular compute nodes (e.g., such that the accessing system 150 may restore the file regardless of whether one of the compute nodes 132 is available).

Further, snapshots created as described therein include snaplines which allow for efficiently reading particular historical data of the file system. More specifically, the snapshots as described herein allow for replicating changes that occurred since a prior snapshot and finding relevant metadata in the replicated changes. This efficiency allows for conserving computing resources when accessing historical data, particularly when the replicated file system is used as a backup that stores a large amount of historical data.

At S320, at least a portion of the file system for which a snapshot was taken at S310 is replicated based on the snapshot by generating and storing replicated file system data. The remote object storage is remote from the original storage in which the file system was stored. In an embodiment, both the original storage and the remote object storage include multiple storage nodes such that data in each storage can be partitioned.

The replicated file system data includes data and metadata. In an embodiment, the data and metadata are sharded, and the metadata is distributed at least partially as sharded filter objects. Sharding the data significantly reduces the amount of data that needs to be searched when attempting to access a specific portion of metadata. Data in each shard may be filtered using the metadata stored in the filter objects, thereby efficiently navigating to the desired portion of metadata within the replicated file system. In an embodiment, the contents of the metadata in the replicated file system are the same as the contents of the metadata in the original file system except for pointers to data because the underlying locations of data stored in the respective storages of the original and replicated file systems are different. As a non-limiting example, when the original file system includes metadata as described above with respect to FIG. 2, the contents of that metadata which are copied to the replicated file system include identical element handles, identical element attribute fields, and the like.

In a further embodiment, the contents of the metadata are largely the same between the original file system and the replicated file system as noted above, but the respective structures of the metadata may be different. As a non-limiting example, the metadata of the original file system may be structured using blocks as described above with respect to FIG. 2, while the metadata of the replicated file system may be structured using objects and blobs as described below with respect to FIG. 4.

The filter objects include metadata related to blobs, where the blobs include data blobs having portions of the data of the replicated file system and metadata blobs having metadata indicating locations in storage of the data blobs. The filter objects allow for efficiently filtering blobs, thereby discovering desired portions of metadata, underlying data, or both, more quickly and with a lower amount of data that needs to be searched.

Figure 4:
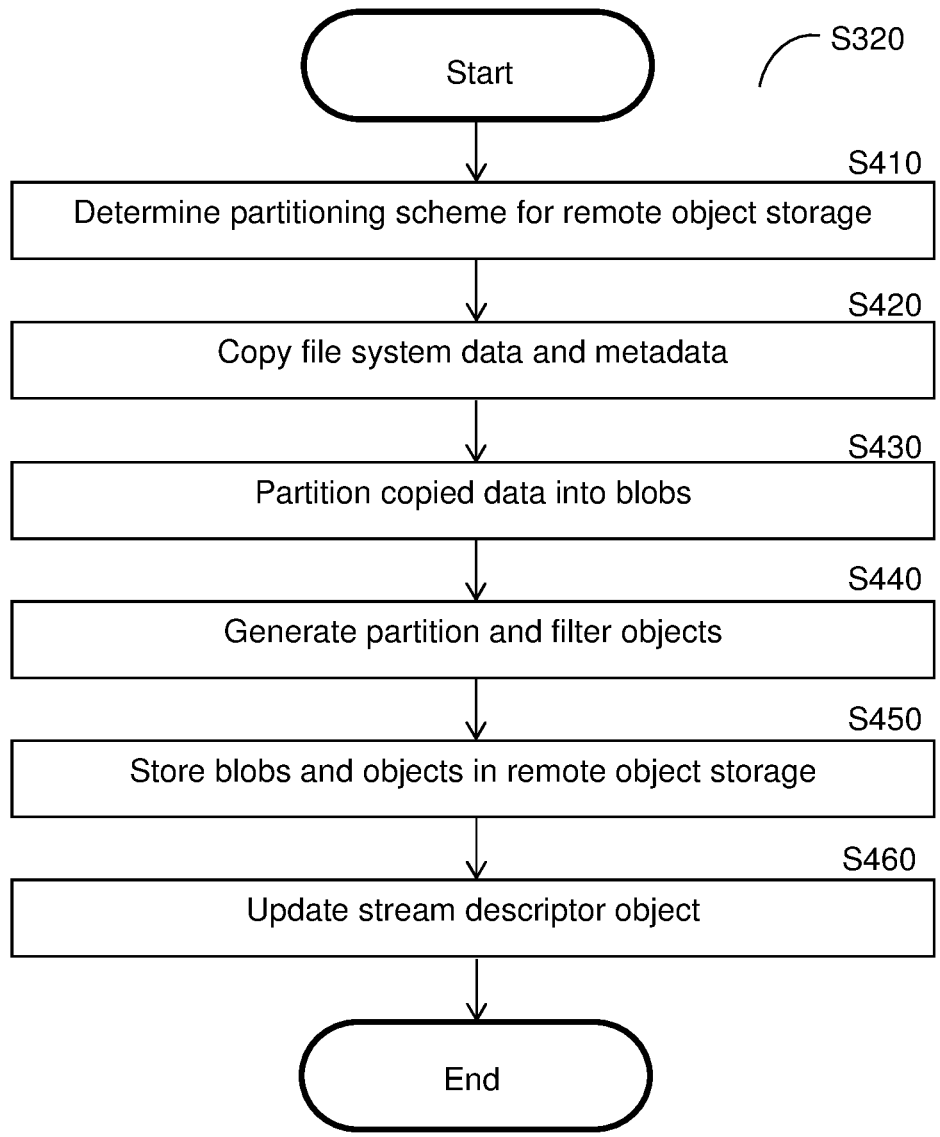
FIG. 4 is a flowchart illustrating a method for distributing filter objects as part of a replicated file system directory according to an embodiment.

Generating replicated file system data such as filter objects and blobs is now described with respect to FIG. 4. FIG. 4 is a flowchart S320 illustrating a method for generating and storing replicated file system data according to an embodiment.

At S410, a partitioning scheme is determined for the remote object storage. In an embodiment, the partitioning scheme determined at S410 is the same as a partitioning scheme of the original storage location of the file system to be replicated. As a non-limiting example, when a file system or portion thereof to be replicated is sharded among 10 shards in storage nodes (e.g., the DNodes 134, FIG. 1) at the original storage location, the replicated file system is also sharded among 10 shards in servers or other storage nodes (e.g., the servers 145, FIG. 1) at the remote object storage.

At S420, file system data and metadata are copied from the original storage of the file system. The file system data includes the underlying data stored by the file system such as, but not limited to, media content. The file system metadata includes at least metadata defining a file system hierarchy such as, but not limited to, pointers to respective locations of the underlying data, pointers from one portion of metadata to another, and the like. The file system metadata may include metadata related to snapshots and snaplines as described herein.

In an embodiment, S420 includes initializing crate objects and appending a portion of the copied data and metadata to each of the crate objects. In an example implementation, each crate object is associated with a given shard, stream, and snap range of snaplines of a snapshot. The shard for each crate object corresponds to a shard of the original file system. The stream includes all of the data and metadata being copied as part of the replication of the file system during a given replication.

In an embodiment, creating each crate object includes initializing the crate object, appending content (e.g., data and metadata blobs) to the crate object, issuing a checkpoint call, storing blob indices returned by the checkpoint call, and issuing a checkpoint stamp for the crate object. When initializing the crate object, the crate object is provided with a time stamp. If the node creating the crate fails while appending content to the crate object, the crate object is re-initialized and provided with a new time stamp before attempting to append the content to the crate object again. The checkpoint call returns when all blobs of a respective portion of the crate have been uploaded and provides the next index for each blob (i.e., the blobs are organized based on order of upload such that the next index for a blob is an index of the next blob in the order of upload). Issuing the checkpoint stamp includes uploading the stamp to the remote object storage. Each checkpoint stamp indicates that the respective portion of the crate has been successfully uploaded and is therefore valid. If the node creating the crate object fails while issuing a checkpoint stamp, the portion of the crate object is re-initialized and provided with a previously uploaded timestamp for the crate before attempting to issue the checkpoint stamp again.

In this regard, it has been identified that, in eventual consistency systems, the order of events related to writing data and metadata is not guaranteed such that the objects which are accessible may not accurately reflect the objects which are visible in metadata. Using checkpoint stamps allows for ensuring that the system reading the data is aware of the current crate contents regardless of whether those contents are currently visible (i.e., indicated in metadata).

In an embodiment, the stream is characterized by a stream descriptor object. The stream descriptor object provides a single source of truth for the global stream state. The stream descriptor object includes identifying information for the stream such as, but not limited to, name, top directory, identifier (e.g., a globally unique identifier), number of shards in the original file system to be replicated, list of all valid crates including data of the stream, combinations thereof, and the like. The name may further include a version value indicating a version of the stream. Alternatively or collectively, the stream descriptor object may include a separate value version entry. The list of all valid crates may further include crate-related metadata such as, but not limited to, crate identifier, snap range (i.e., a range of snaplines represented by the crate) or other identified of a portion of the snapshot, creation time, logical size, physical size, combinations thereof, and the like.

In an embodiment, a stream anchor object may be stored in addition to the stream descriptor object. The stream anchor object may be stored at the time of creation of the stream and may include, but is not limited to, the identifier of the stream. The stream anchor allows for recognizing that a stream currently exists even when the stream descriptor object is not visible to a reader (e.g., one of the CNodes 132 or the accessing system 150, FIG. 1). In this regard, it has been identified that, in some eventual consistency implementations, a given stream may be present but transiently inaccessible such that, without some form of anchor object, a reader checking for an existing stream may inaccurately determine that there is no current stream.

At S430, the copied file system data and metadata are partitioned into data blobs and metadata blobs, respectively. More specifically, the data and metadata appended to each crate are partitioned into respective blobs. The partitioning scheme used to partition the data and metadata matches the partitioning scheme of the original file system.

Each data blob stores portions of data (e.g., chunks) and a list of the portions of data stored in the data blob. The portions of data can be read directly from the data blob without requiring reading any header of the data blob. To this end, each data blob may store a header for each entry including one of the listed portions of data.

At S440, partition descriptor objects and filter objects are generated based on the blobs.

In an embodiment, the partition descriptor objects include shard descriptor objects. Each shard has a respective shard descriptor object. In a further embodiment, each shard descriptor object includes a list of filter objects associated with the respective shard. Whenever a crate is replicated or deleted, the filter objects of the shards of the replicated file system are changed. The shard descriptor acts as an atomic source of truth for the filter objects of each crate in each shard as the filter objects change. In yet a further embodiment, each shard descriptor object may further include a list of snapshots associated with the respective shard. Such a list allows for identifying when a snapshot indicated in a stream descriptor object is unavailable in a given shard. This, in turn, allows for ceasing the search rather than performing filtering to search for metadata which is no longer in the replicated file system.

In an embodiment, each filter object includes a list of metadata blobs for a given shard, bucket, and range of snapshot, as well as corresponding metadata related to each metadata blob. The metadata blobs include at least data content blobs having pointers to underlying data blobs of the replicated file system such that using the filter objects to identify underlying data blobs allows for efficiently navigating through metadata without requiring a traversal-based navigation. To this end, each data blob may include, but is not limited to, name, logical range, and a hash-based filter of pointers to respective underlying data blobs. Each metadata blob may further include a header indicating information such as, but not limited to, blob version, error detecting code (e.g., cyclic redundancy checks), and the like. Each data blob including underlying data may include such a header for each data entry included in the data blob.

The metadata blobs may further include name metadata of the original file system, deleted metadata identifiers of portions of metadata (e.g., element handles as described above), or both. The name metadata may include, but is not limited to, attributes (e.g., attributes having keys and corresponding values as described above), links between portions of the original file system metadata, and the like. Storing deleted metadata identifiers such as handles allows for reducing use of computing resources required for delete operations. More specifically, by storing lists of deleted metadata identifiers in dedicated blobs, such deleted metadata identifiers may be more efficiently accessed than requiring fetching the deleted identifiers from their respective blobs during delete operations.

In an optional embodiment, each filter object may further include additional data to be used for further improving filtering. Such data may include, but is not limited to, data content filters, name content filters, or both.

The data content filters include entries stored at a given offset resolution (e.g., 1 Megabyte) used to test for the existence of a given handle having that offset without requiring searching the entire shard to determine whether a particular (handle,offset) combination is valid. As a non-limiting example, for an offset 1 Megabyte+300 KB (1 MB+300 KB), the data content filter may include an entry corresponding to (handle, [1 MB, 2 MB)). The data content filters further include a logical range covered by the blob including each data content filter.

The name content filters include entries for specific names that allow for efficiently looking up those specific names. As a non-limiting example, such an entry may be in the form (handle, entry_type, name). In some implementations, to further support efficient listing of entries, a dummy entry is added to filter objects. The dummy entry may be in the form, for example, (handle,""). The name content filters further include a logical range covered by the blob including each name content filter.

The filter objects allow for efficiently reading and deleting snapshots and, therefore, accessing data in the replicated file system. In an embodiment, the filter objects are organized with respect to shard, bucket, and range of data within the snapshot. The buckets may be defined based on, but not limited to, handles and offsets or names. In another embodiment, the size of each filter object may be selected such that any applicable requirements for read and update flows are balanced against each other. The requirements may be predefined and may depend, for example, on expected read and write demands. As a non-limiting example, for data that is expected to be read but not updated (e.g., replicated or deleted) often, a single, relatively large (e.g., having a size above a threshold), filter object may be included in each bucket. As another non-limiting example, multiple smaller filter objects may be included in each bucket for data that is expected to be updated frequently. The expected read and write demands may be predetermined based on, for example, a type of data, whether the data is being used as an archive or as a current backup, and the like.

In another embodiment, deleting snapshots from the replicated file system includes storing deletion markers in the replicated file system such that not all metadata blobs need to be deleted. In this regard, it is noted that deletion of metadata affects storage performance due to the large amounts of data which need to be read and rewritten. Accordingly, storing deletion markers allows for tracking deletion of metadata blobs without actually requiring deleting those metadata blobs. Moreover, by storing deletion markers, it may be checked whether each metadata blob needs to be updated because its content is no longer valid without requiring scanning the whole metadata blob. To this end, for every shard of the replicated file system affected by deletion of a snapshot from the replicated file system, a deletion marker is stored when at least a portion of a metadata blob has been deleted when deleting the snapshot. When filtering to find data in the replicated file system, the deletion markers may be utilized to identify metadata that is no longer present.

In a further embodiment, the shard descriptor and filter objects are updated during a session in which persistent locks are taken to prevent concurrent writes. That session ends when it is verified that the new version of the shard descriptor object is visible in the remote object storage. Taking persistent locks until a new version of the shard descriptor object is visible in the new storage ensures consistency.

It should be noted that, in an embodiment, the shard descriptor and filter objects may store data related to crates which are not yet, or are no longer, identified in the stream descriptor object. As noted above, the stream descriptor object stores data indicating which crates are valid such that, even if the shard descriptor and filter objects identify invalid crates, such crates will be recognized as invalid upon reading the stream descriptor object. As a non-limiting example, if a portion of a crate is deleted from any shard, the stream descriptor object may be updated to mark that crate as invalid. Thus, in such an example, even if other portions of the crate have not yet been deleted from the other shards such that the other portions of the crate are represented in shard descriptor and filter objects of the other shards, those other portions of the crate will still be identified as invalid.

At S450, the blobs and objects created at S430 and S440 are stored in the remote object storage.

At S460, a stream descriptor object is updated when the blobs and objects are finished being stored. In an embodiment, S460 includes validating that the remote object storage includes the snapshot captured at S410. In such an embodiment, it is determined that the blobs and objects are finished being stored when the existence of the snapshot in the remote object storage is validated. Validating that the snapshot is stored in the remote object storage prior to updating the stream descriptor object ensures that the stream descriptor object is accurately updated such that the same snapshot is stored both in the storage holding the original file system and in the storage holding the replicated file system.

In an embodiment, only the latest version of a stream descriptor object (e.g., a version having a version value representing the most recent version as compared to other version values) is considered valid, and older versions of the stream descriptor object are deleted. To this end, in an embodiment, S460 includes generating a new version of the stream descriptor object based on the replicated file system, storing the new version of the stream descriptor object, and deleting any previous versions of the stream descriptor object.

Returning to FIG. 3, at optional S330, a request requiring access to the replicated data, metadata, or both, is received. The request indicates identifying information about the requested data or metadata.

At S340, a relevant portion of the replicated file system is accessed. In an embodiment, S340 includes navigating through the sharded portions of the replicated file system using filtering. More specifically, filter objects in a relevant shard are utilized to filter for specific data blobs, metadata blobs, or both. In a further embodiment, S340 may include, but is not limited to, reading the relevant portion of the replicated file system, writing to one or more data blobs of the replicated file system, restoring a file based on the replicated file system, updating any metadata blobs affected by changes to the replicated file system, combinations thereof, and the like. An example method for accessing a replicated file system is described further below with respect to FIG. 5.

It should be noted that the steps of FIG. 3 are described as being performed by a single system (e.g., one of the compute nodes 132, FIG. 1), but that portions of the disclosed embodiments may be equally performed by different systems. As non-limiting examples, a first CNode 132-1 may perform the replication described with respect to S320 and a second CNode 132-2 may perform the access of the replicated data described with respect to S340 or one of the CNodes 132 may perform the replication of S320 and the accessing system 150.

Figure 5:
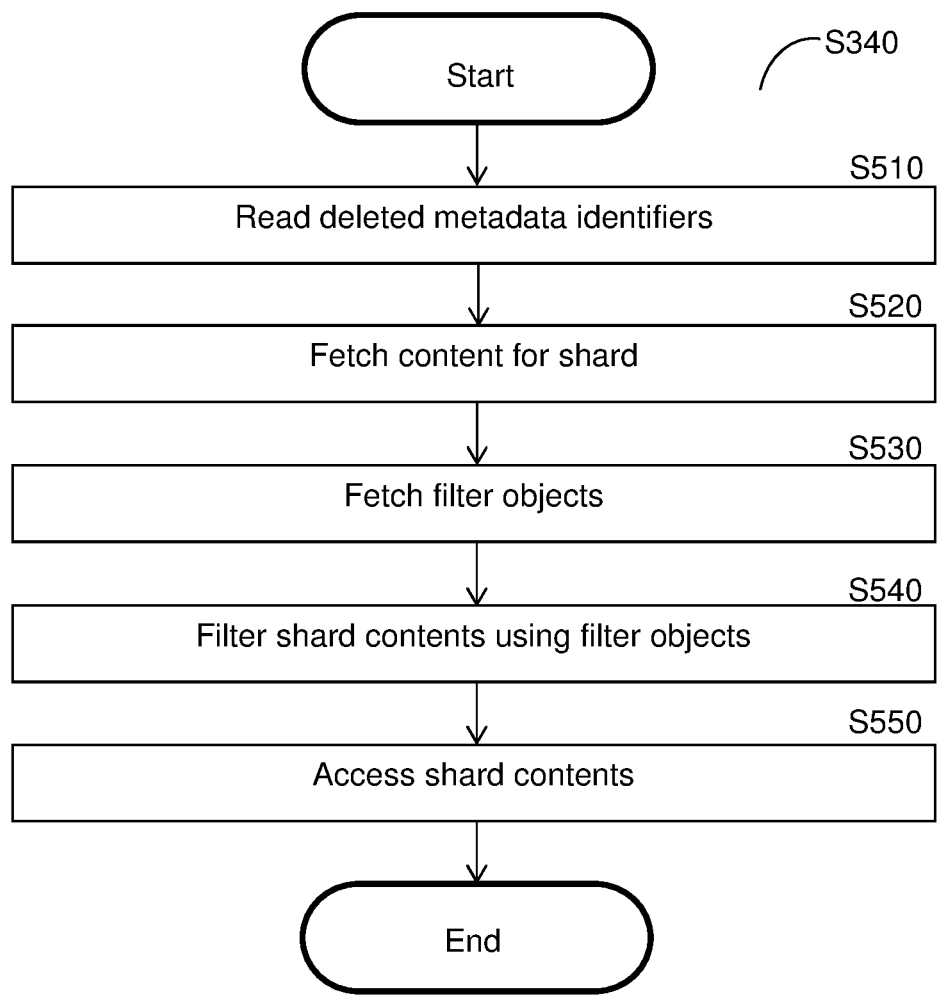
FIG. 5 is a flowchart illustrating a method for accessing a replicated file system according to an embodiment.

FIG. 5 is an example flowchart S340 illustrating a method for accessing a replicated file system according to an embodiment.

At S510, metadata identifiers of deleted portions of metadata in the remote object storage are read. In an embodiment, S510 includes reading each blob storing lists of deleted metadata identifiers. As noted above, some dedicated blobs storing lists of deleted metadata identifiers may be maintained such that these dedicated blobs may be read rather than requiring searching through all metadata blobs in the replicated file system.

In an embodiment, the metadata identifiers are written to respective filter buckets. To this end, the deleted handles are separated according to buckets in which they were stored prior to deletion. The filter buckets are temporary buckets used for a given filtering and may be stored, for example, in random access memory. Content of a shard may be filtered using one filter bucket at a time.

At S520, for a given shard in the remote object storage, content of the shard is fetched. The fetched content may include all data blobs of the shard. The fetched content is separated into respective buckets and written to filter buckets.

At S530, filter-related data of the shard is fetched. The filter-related data may include, but is not limited to, metadata blobs listed in filter objects of the shard.

At S540, the content of the shard is filtered based on the fetched filter-related data. The filtering results in navigating to metadata blobs including pointers to one or more data blobs.

At S550, the shard contents are accessed based on the filtering. In an embodiment, S550 includes accessing the data blobs pointed to by metadata blobs found during the filtering.

Figure 6:
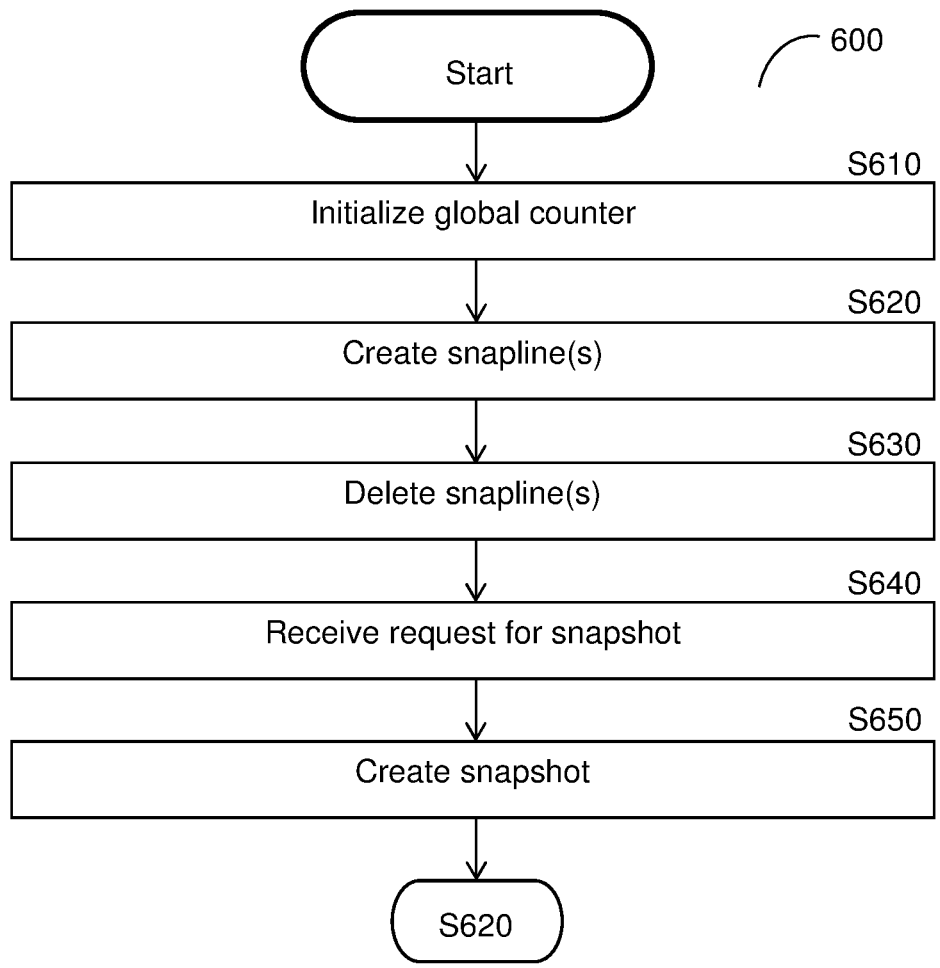
FIG. 6 is a flowchart illustrating a method for providing improved efficiency snapshots according to an embodiment.

FIG. 6 is an example flowchart 600 illustrating a method for providing improved efficiency snapshots according to an embodiment. The method may be utilized to provide snapshots for a distributed storage system such as the distributed storage system 130, FIG. 1. To this end, compute nodes of the distributed storage system may be configured to store bitmap data used for maintaining snaplines as described herein. In an example implementation, bitmap blocks are used to store the snaplines.

At S610, a global counter is initialized for all compute nodes in a storage system (e.g., the CNodes 132 of the distributed storage system 130, FIG. 1). The global counter is a variable used to provide a uniform time across the compute nodes with respect to snaplines created for the storage system. In an example implementation, the global counter is initialized as zero and increased in integer increments (e.g., 1, 2, 3, etc.). The global counter is updated, for example, at periodic intervals (e.g., every second). In an embodiment, updating the global counter includes incrementing the global counter and storing the current value of the global counter in one of the storage nodes in the storage system (e.g., one of the DNodes 134, FIG. 1).

At S620, snaplines are created. The snaplines may be created, for example, at periodic intervals as the global counter is updated (i.e., such that each snapline represents data in the storage system at the most recent time of the global counter). To this end, creating a snapline may include updating the global counter and recording snapline data including the current value of the global counter and status markers with corresponding offset ranges. Each status marker indicates whether the corresponding offset range is written to or not at the time represented by the updated global counter's value. Each snapline is created by one of the compute nodes in the storage system such that updating the global counter includes that compute node increasing the global counter's value and storing the increased value in one of the storage nodes.

In an embodiment, to ensure crash consistency for snapshots created using the snaplines, a single global counter is maintained based on remote direct memory access (RDMA). To this end, the global counter may be incremented and stored in one of the storage nodes. Incrementing the global counter includes storing a current value of the global counter as a timestamp of a snapline, where the current value increases each time metadata in the storage system is modified and a snapline is created for the modified metadata. In an example implementation, the incrementation may be first performed on NVRAM of the storage node and then on RAM of the storage node. In some implementations, if the value of the global counter is different in NVRAM than in RAM after a crash, the compute node performing the incrementing may correct the global counter accordingly. When the storage node becomes unavailable, a new storage node may be used to store the global counter. A RDMA read operation may be performed each time an input/output operation would modify the stored data to access the current global counter time and then the global counter is implemented via a write to the storage location of the global counter.

In the RDMA-based global counter implementation, the global counter is stored in a single location that may be read from any of the compute nodes when the global counter is needed, thereby ensuring that the time is consistent among the compute nodes at any point. Further, since maintaining the global counter only requires basic read and write operations, there is no two-phase commit or delayed input/output operations. Accordingly, this provides a robust yet simple process for ensuring crash consistency among storage nodes.

In an alternative embodiment, to ensure crash consistency for snapshots created using the snaplines, creating a new snapline includes pausing write acknowledgments while a new snapline is being created. This ensures that dependent writes are not included in any snaplines without also including their respective dependencies.

Figure 7:
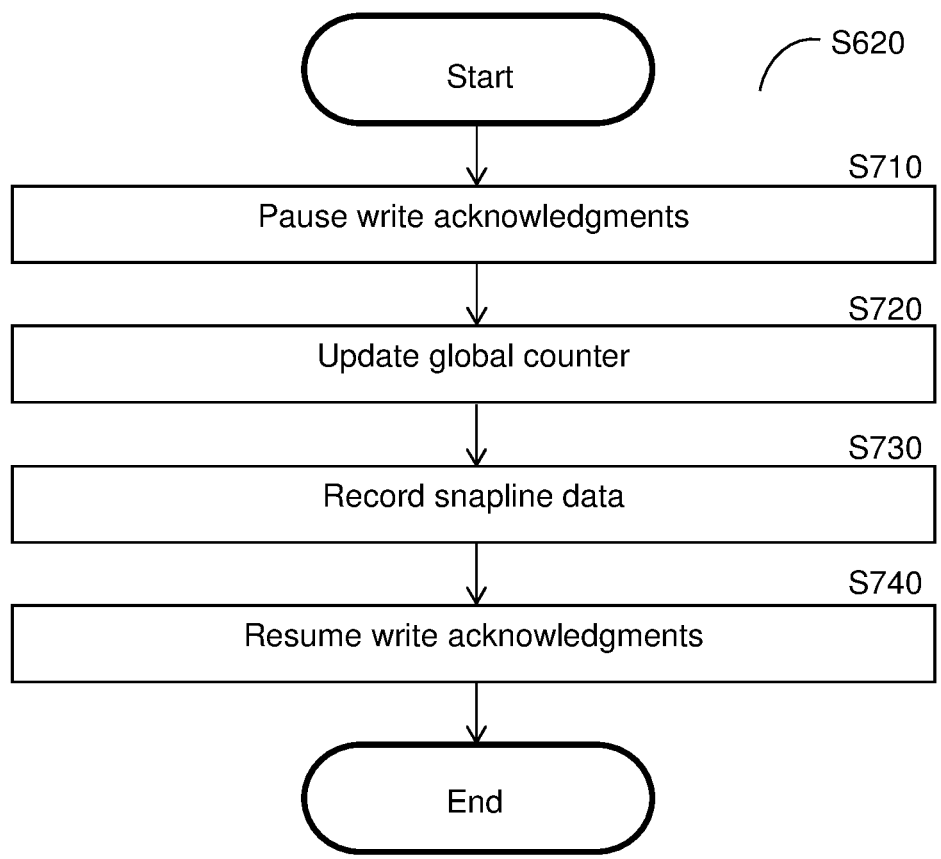
FIG. 7 is a flowchart illustrating a method for creating snaplines while ensuring crash consistency according to an embodiment.

FIG. 7 is an example flowchart S620 illustrating a method for creating snaplines while ensuring crash consistency according to an embodiment. In an embodiment, a snapline is created by one of multiple compute nodes in a storage system. At S710, write acknowledgments are paused as creation of the snapline begins. In an embodiment, S710 includes instructing all other nodes in the storage system to stop acknowledging writes. At S720, the global counter is updated. As noted above, new snaplines may be created and the global counter may be updated periodically, for example every second. At S730, snapline data including the value of the updated global counter and status markers for respective offset ranges are recorded. In an embodiment, the snapline data is recorded in a bitmap data structure such as the bitmap blocks 213, FIG. 2. At S740, when the snapline creation is finished, the other compute nodes are instructed to resume write acknowledgments.

Returning to FIG. 6, at optional S630, snaplines may be deleted. In an example implementation, the snaplines are deleted according to a sampling scheme such that the total number of snaplines maintained by the storage system remains constant over time. In other implementations, snaplines may be deleted according to different schemes. In an embodiment, the deleted snaplines do not include snaplines marked as non-erasable in previously created snapshots.

At S640, a request for a snapshot is received. The request indicates at least a time with respect to the global counter and may further include an indication of a portion of the storage system for which a snapshot is desired.

At S650, the snapshot is created based on the requested time and execution resumes with S620. Specifically, the snapshot indicates a snapline having a timestamp matching the requested time that is not to be erased.

Figure 8:
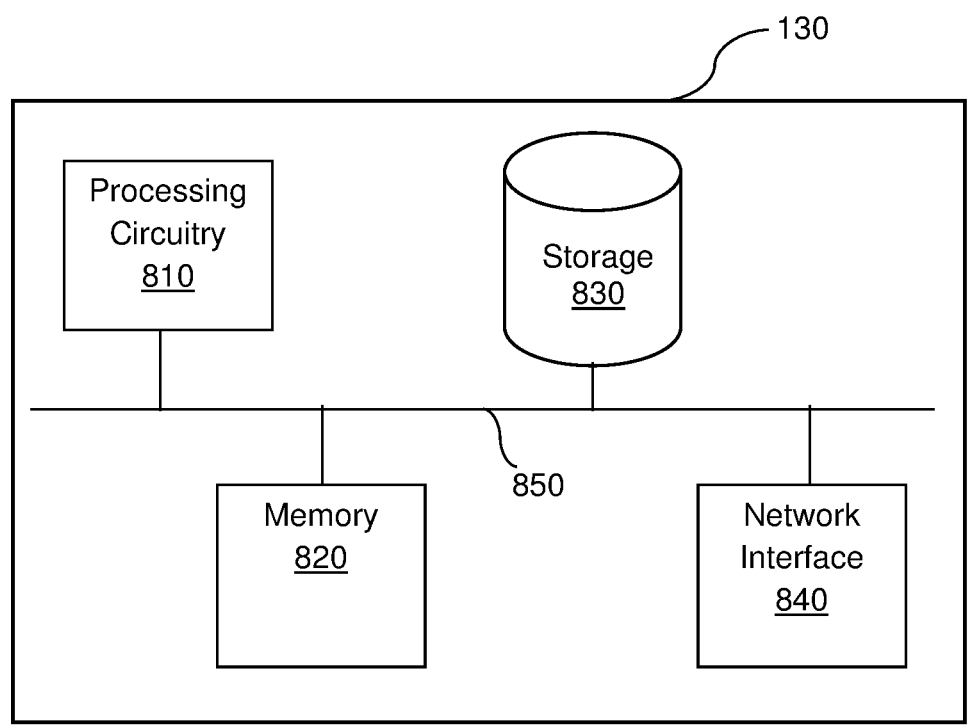
FIG. 8 is a schematic diagram of a compute node according to an embodiment.

FIG. 8 is a schematic diagram of a CNode 132 according to an embodiment. The CNode 132 includes a processing circuitry 810, a memory 820, a storage 830, and a network interface 840.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 820 may be volatile (e.g., RAM, etc.) memory. In an embodiment, the memory 820 is configured to store software for execution by the processing circuitry 810. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 810 to perform the various processes described herein.

The storage 830 may be magnetic storage, optical storage, and the like, and may be realized, for example, as flash memory or other non-volatile memory technology, CD-ROM, Digital Versatile Disks (DVDs), or any other non-transitory computer readable medium which can be used to store the desired information. The storage 830 may store the instructions for transfer to and storage in the memory 820 for execution by the processing circuitry 810.

The network interface 840 allows the CNode 132 to receive access commands and send data over the network 110, FIG. 1. More specifically, the network interface 840 may allow the CNode 132 to communicate with an object storage over the network 110 via, for example, a web service interface.

It should be understood that the embodiments described herein are not limited to CNodes having the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for replicating a file system, comprising:
copying at least a portion of the file system from a first storage, wherein the at least a portion of the file system includes underlying data and metadata, wherein the metadata includes pointers to portions of the underlying data and metadata defining a file system hierarchy of the file system;
partitioning the copied data of the file system into a plurality of blobs, wherein the plurality of blobs includes a plurality of data blobs and a plurality of metadata blobs, wherein each data blob includes at least one portion of the underlying data, wherein the plurality of metadata blobs include a plurality of data content blobs and a plurality of name content blobs, the data content blobs having pointers to respective data blobs of the plurality of data blobs, wherein the name content blobs are created based on the metadata defining the file system hierarchy of the file system;
generating a plurality of filter objects based on the copied data, wherein each filter object includes a list of metadata blobs, wherein the metadata blobs listed in each filter object include at least one of the plurality of data content blobs and at least one of the name content blobs; and storing the plurality of blobs and the plurality of filter objects in a second storage.

2. The method of claim 1, wherein the copied data of the file system is partitioned based on a snapshot of the file system, wherein the snapshot represents a state of metadata in the file system at a point in time.

3. The method of claim 1, wherein the file system in the first storage is sharded into a plurality of shards, wherein the copied at least a portion of the file system is partitioned based on the plurality of shards.

4. The method of claim 3, further comprising:
generating a shard descriptor object for each of the plurality of shards based on the copied at least a portion of the file system, wherein each shard descriptor object includes a list of filter objects associated with one of the plurality of shards; and
storing each generated shard descriptor object in the second storage.

5. The method of claim 4, wherein each shard descriptor further includes a list of valid snapshots of the file system.

6. The method of claim 1, the second storage storing a plurality of snapshots of the first storage, wherein the first storage is sharded into a plurality of first shards, wherein the second storage is sharded into a plurality of second shards based on the plurality of first shards, further comprising:
storing at least one deletion marker in one of the plurality of second shards that is affected by a deletion of one of the plurality of snapshots, wherein each deletion marker indicates a respective metadata blob of the plurality of metadata blobs that was affected by the deletion.

7. The method of claim 1, wherein the metadata blobs further include a plurality of metadata identifiers of deleted portions of metadata.

8. The method of claim 1, wherein the second storage further includes a stream descriptor object, wherein the stream descriptor object indicates a global stream state of the second storage, further comprising:
validating that the snapshot is stored in the second storage; and
updating the stream descriptor object when it is validated that the snapshot is stored in the second storage.

9. The method of claim 1, further comprising:
for one of the plurality of shards, fetching each data blob of the shard;
fetching each metadata blob listed in each filter object of the shard; and
filtering the fetched data blobs based on the fetched metadata blobs.

10. The method of claim 1, further comprising:
initializing a plurality of crate objects in the second object storage, wherein a crate object is initialized for each of the plurality of shards; and
appending at least one of the plurality of data blobs and of the plurality of metadata blobs to each of the plurality of crate objects.

11. A non-transitory computer readable medium having stored thereon instructions for causing a processing circuitry to execute a process, the process comprising: copying at least a portion of a file system from a first storage, wherein the at least a portion of the file system includes underlying data and metadata, wherein the metadata includes pointers to portions of the underlying data and metadata defining a file system hierarchy of the file system; partitioning the copied data of the file system into a plurality of blobs, wherein the plurality of blobs includes a plurality of data blobs and a plurality of metadata blobs, wherein each data blob includes at least one portion of the underlying data, wherein the plurality of metadata blobs include a plurality of data content blobs and a plurality of name content blobs, the data content blobs having pointers to respective data blobs of the plurality of data blobs, wherein the name content blobs are created based on the metadata defining the file system hierarchy of the file system; generating a plurality of filter objects based on the copied data, wherein each filter object includes a list of metadata blobs, wherein the metadata blobs listed in each filter object include at least one of the plurality of data content blobs and at least one of the name content blobs; and storing the plurality of blobs and the plurality of filter objects in a second storage.

12. A system for replicating a file system, comprising:
a processing circuitry; and
a memory, the memory containing instructions that, when executed by the processing circuitry, configure the system to:
copy at least a portion of the file system from a first storage, wherein the at least a portion of the file system includes underlying data and metadata, wherein the metadata includes pointers to portions of the underlying data and metadata defining a file system hierarchy of the file system;
partition the copied data of the file system into a plurality of blobs, wherein the plurality of blobs includes a plurality of data blobs and a plurality of metadata blobs, wherein each data blob includes at least one portion of the underlying data, wherein the plurality of metadata blobs include a plurality of data content blobs and a plurality of name content blobs, the data content blobs having pointers to respective data blobs of the plurality of data blobs, wherein the name content blobs are created based on the metadata defining the file system hierarchy of the file system;
generate a plurality of filter objects based on the copied data, wherein each filter object includes a list of metadata blobs, wherein the metadata blobs listed in each filter object include at least one of the plurality of data content blobs and at least one of the name content blobs; and
store the plurality of blobs and the plurality of filter objects in a second storage.

13. The system of claim 12, wherein the copied data of the file system is partitioned based on a snapshot of the file system, wherein the snapshot represents a state of metadata in the file system at a point in time.

14. The system of claim 12, wherein the file system in the first storage is sharded into a plurality of shards, wherein the copied at least a portion of the file system is partitioned based on the plurality of shards.

15. The system of claim 14, wherein the system is further configured to:
generate a shard descriptor object for each of the plurality of shards based on the copied at least a portion of the file system, wherein each shard descriptor object includes a list of filter objects associated with one of the plurality of shards; and
store each generated shard descriptor object in the second storage.

16. The system of claim 15, wherein each shard descriptor further includes a list of valid snapshots of the file system.

17. The system of claim 12, the second storage storing a plurality of snapshots of the first storage, wherein the first storage is sharded into a plurality of first shards, wherein the second storage is sharded into a plurality of second shards based on the plurality of first shards, wherein the system is further configured to: store at least one deletion marker in one of the plurality of second shards that is affected by a deletion of one of the plurality of snapshots, wherein each deletion marker indicates a respective metadata blob of the plurality of metadata blobs that was affected by the deletion.

18. The system of claim 12, wherein the metadata blobs further include a plurality of metadata identifiers of deleted portions of metadata.

19. The system of claim 12, wherein the second storage further includes a stream descriptor object, wherein the stream descriptor object indicates a global stream state of the second storage, wherein the system is further configured to:
    validate that the snapshot is stored in the second storage; and
    update the stream descriptor object when it is validated that the snapshot is stored in the second storage.

20. The system of claim 12, wherein the system is further configured to:
    for one of the plurality of shards, fetch each data blob of the shard;
    fetch each metadata blob listed in each filter object of the shard; and
    filter the fetched data blobs based on the fetched metadata blobs.

21. The system of claim 12, wherein the system is further configured to:
    initialize a plurality of crate objects in the second object storage, wherein a crate object is initialized for each of the plurality of shards; and
    appending at least one of the plurality of data blobs and of the plurality of metadata blobs to each of the plurality of crate objects.

* * * * *